(12) United States Patent
Choi

(10) Patent No.: US 9,397,795 B2
(45) Date of Patent: Jul. 19, 2016

(54) SIMULTANEOUS TRANSMIT AND RECEIVE

(71) Applicant: INTEL CORPORATION, Santa Clara, CA (US)

(72) Inventor: Yang-Seok Choi, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/125,253

(22) PCT Filed: Jun. 27, 2013

(86) PCT No.: PCT/US2013/048342
§ 371 (c)(1),
(2) Date: Dec. 10, 2013

(87) PCT Pub. No.: WO2014/008104
PCT Pub. Date: Jan. 9, 2014

(65) Prior Publication Data
US 2015/0049650 A1   Feb. 19, 2015

Related U.S. Application Data

(60) Provisional application No. 61/667,325, filed on Jul. 2, 2012.

(51) Int. Cl.
*H04L 5/00* (2006.01)
*H04L 5/14* (2006.01)
(Continued)

(52) U.S. Cl.
CPC ............ *H04L 1/1861* (2013.01); *H04L 1/0025* (2013.01); *H04L 1/0026* (2013.01); *H04L 1/1628* (2013.01); *H04L 1/1812* (2013.01); *H04L 1/1854* (2013.01); *H04L 1/1887* (2013.01); *H04L 5/0048* (2013.01); *H04L 5/0053* (2013.01); *H04L 5/0055* (2013.01); *H04L 5/0073* (2013.01); *H04L 5/14* (2013.01); *H04W 4/005* (2013.01); *H04W 24/10* (2013.01);
(Continued)

(58) Field of Classification Search
CPC ...... H04L 5/0073; H04L 5/14; H04W 72/046; H04B 7/0617; H04B 7/086; H04B 7/024; H04B 7/0452; H04B 7/0469
See application file for complete search history.

(56) References Cited

U.S. PATENT DOCUMENTS 4,103,303 A * 7/1978 Regenos et al. ............... 342/368
7,579,995 B1 * 8/2009 Theunissen et al. .......... 343/742
(Continued)

FOREIGN PATENT DOCUMENTS

WO   2014/008104 A1   1/2014

OTHER PUBLICATIONS

International Search Report and Written Opinion received for PCT Patent Application No. PCT/US2013/048342, mailed on Oct. 16, 2013, 11 Pages.
(Continued)

*Primary Examiner* — Hoang-Chuong Vu
(74) *Attorney, Agent, or Firm* — Thorpe North & Western LLP

(57) ABSTRACT

A simultaneous transmit and receive technology is described. A downlink transmission and an uplink receive beam are formed at a base station (BS) having a beam pattern with predetermined nulls. The predetermined nulls are formed over predetermined elevation angles to reduce interference with a proximate BS. Transmission and reception occur simultaneously using the beam pattern from the BS.

20 Claims, 11 Drawing Sheets

(51) Int. Cl.

| | |
|---|---|
| *H04W 72/04* | (2009.01) |
| *H04L 1/18* | (2006.01) |
| *H04W 28/08* | (2009.01) |
| *H04W 24/10* | (2009.01) |
| *H04W 52/02* | (2009.01) |
| *H04W 72/00* | (2009.01) |
| *H04W 92/02* | (2009.01) |
| *H04W 4/00* | (2009.01) |
| *H04W 36/22* | (2009.01) |
| *H04W 48/12* | (2009.01) |
| *H04W 68/00* | (2009.01) |
| *H04L 1/00* | (2006.01) |
| *H04L 1/16* | (2006.01) |
| *H04W 88/08* | (2009.01) |

(52) U.S. Cl.
CPC ............. *H04W 28/08* (2013.01); *H04W 36/22* (2013.01); *H04W 48/12* (2013.01); *H04W 52/0206* (2013.01); *H04W 52/0209* (2013.01); *H04W 52/0212* (2013.01); *H04W 52/0245* (2013.01); *H04W 68/00* (2013.01); *H04W 72/005* (2013.01); *H04W 72/042* (2013.01); *H04W 72/046* (2013.01); *H04W 72/0413* (2013.01); *H04W 72/0446* (2013.01); *H04W 92/02* (2013.01); *H04W 88/08* (2013.01); *Y02B 60/50* (2013.01); *Y02E 40/62* (2013.01)

(56) References Cited

U.S. PATENT DOCUMENTS

| | | | |
|---|---|---|---|
| 2002/0042290 A1* | 4/2002 | Williams et al. ............. | 455/562 |
| 2004/0043794 A1* | 3/2004 | Nakaya et al. ................ | 455/561 |
| 2006/0019710 A1* | 1/2006 | Ylitalo ....................... | 455/562.1 |
| 2011/0060956 A1 | 3/2011 | Goldsmith et al. | |
| 2011/0075601 A1 | 3/2011 | Zheng | |
| 2011/0243040 A1 | 10/2011 | Khan et al. | |
| 2012/0068882 A1* | 3/2012 | Blachford ..................... | 342/104 |
| 2012/0155335 A1 | 6/2012 | Khojastepour et al. | |
| 2012/0155341 A1 | 6/2012 | Yamamoto et al. | |
| 2013/0102254 A1* | 4/2013 | Cyzs ....................... | H04B 1/126 455/63.1 |
| 2013/0106667 A1* | 5/2013 | Fenn ....................... | H01Q 1/525 343/793 |
| 2013/0244594 A1* | 9/2013 | Alrabadi et al. ............... | 455/78 |

OTHER PUBLICATIONS

Motorola Mobility, "Downlink MIMO CSI Enhancements for Release-11", R1-112445, 3GPP TSG RAN1 #66, Athens, Greece, Aug. 22-26, 2011, pp. 1-4.

Motorola Mobility, "Scenario and Modeling Discussion for DL-MIMO Enhancement", R1-112444, 3GPP TSG RAN1 #66, Athens, Greece, Aug. 22-26, 2011, pp. 1-4.

3GPP TR 26.947, "Multimedia Broadcast/Multicast Service (MBMS) Selection and Characterisation of Application Layer FEC", Jun. 2012, V1.0.0, Release 11, 50 pages.

Taferner et al, "A Novel Doa-Based Beamforming Algorithm with Broad Nulls", Alcatel Corporate Research Center Stuttgart, Sep. 1999, 6 pages, Stuttgart, Germany.

Zhang et al, "Advanced International Communications", IEEE Vehicular Technology Magazine, Jun. 2011, vol. 6, No. 2, pp. 92-100.

* cited by examiner

SIMULTANEOUS TRANSMIT AND RECEIVE

RELATED APPLICATIONS

The present application claims priority to U.S. Provisional Patent Application No. 61/667,325, filed Jul. 2, 2012, the entire specification of which is hereby incorporated by reference in its entirety for all purposes.

BACKGROUND

Capacity in wireless communication networks is generally limited by the radio spectrum available. The capacity of a wireless communication network, therefore, depends on efficient use of the available radio spectrum. Since the radio spectrum allocated to a wireless cellular network is often fixed and because network operators generally desire increase capacity, there are efforts to make more efficient use of the allocated radio spectrum.

In a wireless cellular network, the allocated radio spectrum is often divided, for example, by time, frequency, and/or space. For instance, the allocated radio spectrum may be divided into a subset of frequency channels. The frequency channels are usually spaced far enough apart so that they do not overlap and generate cross-channel interference. In this regard, each of these channels may be used independently of one another since they use a separate frequency range. In a wireless cellular network, some channels may be dedicated to downlink communication and other channels may be dedicated to uplink communication.

Radio spectrum may also be divided by time and/or space. An uplink channel, for instance, may be divided into distinct time slots. Each user equipment (UE) in the wireless cellular network may be assigned a time slot in which the UE is granted the right to transmit data on the uplink channel. In this sense, the radio spectrum is said to be time divided. Radio spectrum may also be divided by space by reusing, for example, frequencies in disparate locations. For instance, a plurality of cells in the wireless cellular network may cover non-overlapping areas such that a given frequency may be reused across the plurality of cells without experiencing interference on the given frequency.

DETAILED DESCRIPTION

Figure 1:
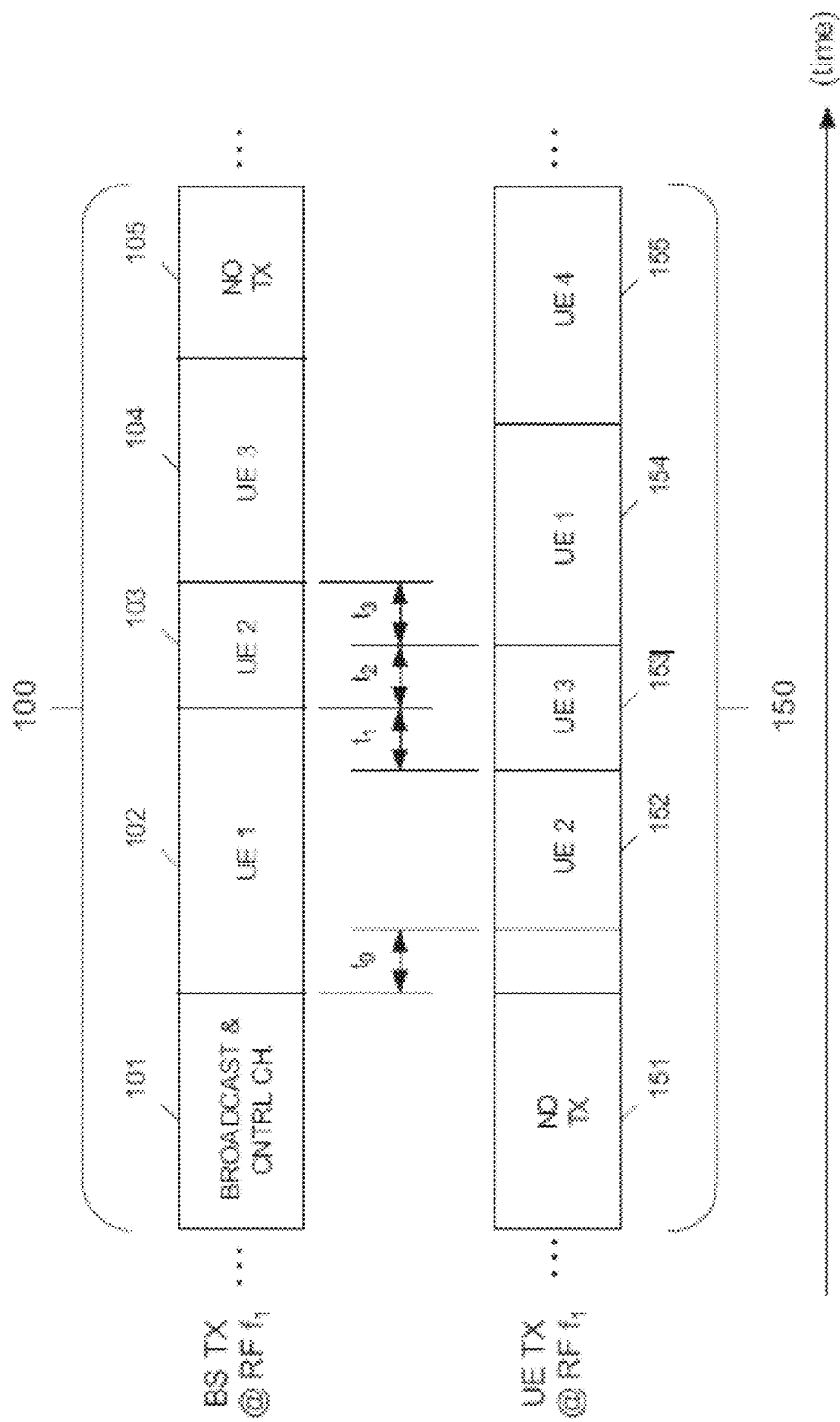
FIG. 1 depicts a temporal relationship diagram for simultaneous transmit and receive (STR) for a portion of an exemplary downlink radio frame and a portion an exemplary uplink radio frame of a channel.

A technology is described that reduces interference between Base Stations (BS) in a wireless cellular network using simultaneous transmission and reception (STR). In particular, a beam forming technique is described that may allow BSs to perform full duplex communication with less BS-to-BS interference. While the term base station is used throughout the application, it is not intended to be limiting. As used herein, the term base station can refer to any transceiver in a cellular type communication system that is configured to communicate with one or more mobile stations or user equipment. This can include communication systems configured to operate based on standards such as the Institute of Electronic and Electrical Engineers (IEEE) 802.16e-2005 and 802.16m-2011 and Third Generation Partnership Project (3GPP) Long Term Evolution Release 8, 9, 10 and 11. Other cellular systems that are configured to allow a single transceiver (i.e. base station or enhanced node B) to communicate with multiple mobile communication devices are also considered to be within the scope of the application.

STR allows transmission on the same frequency at the same time and can potentially double the physical layer capacity. STR can also be referred to as full duplex communication. The use of STR may introduce two new unique interferences into a wireless cellular network comprised of base stations and user equipment (UE). Namely, BS-BS interference and UE-UE interference may occur as a result of STR. These two new interferences may degrade system performance if not handled appropriately. The technology provides devices, systems and methods to reduce BS-BS interference. More specifically, the technology may be used to suppress BS-BS interference. With suppression, BS-BS interference may be less than thermal noise power.

For example, two base stations, such as Evolved Node Bs (eNBs), eNB1 and eNB2, may be located adjacent to one another. A UE may be located within the cell area of eNB1, and may be using STR. In the uplink direction, the UE may transmit with a relatively low amount of power as compared to the power transmitted by the eNB1 and eNB2. In using STR to transmit in the uplink direction the UE may transmit a signal that uses the same frequency at the same time as signals transmitted by both the eNB1 and eNB2. Since the eNB1 may be able to cancel out interference cause by the eNB1's concurrent transmission on the same frequency, it may be able to receive the transmission from the UE. The eNB1, however, may be overwhelmed with a concurrent transmission from the eNB2 on the same frequency. Often eNBs transmit at a much higher power level than UEs. In this way, the eNB2's transmission may interfere with the eNB1's ability to receive the uplink transmission from the UE to the eNB1.

STR or full duplex systems may not only improve the physical layer capacity but may also provide other important benefits in layers beyond the physical layer. For example, STR may reduce end-to-end delay in multi-hop networks. In half duplex systems, each node can start transmission of a packet to the next node only when it is fully received from the prior node in network. Therefore, the end-to-end delay is equal to packet duration multiplied by the number of hops. However, when STR is employed, a node can forward a packet while receiving it, and consequently the end-to-end delay in STR systems can be just a bit longer than the packet duration. This will be a huge advantage over half duplex systems especially as the number of hops grows. Meanwhile, the forwarded packet to next node can play a role of implicit acknowledgement (ACK) to the previous node as well.

STR may achieve the doubled capacity especially in isolated links such as point-to-point communications and wireless backhaul. In cellular systems, however, the situation is different, and additional measurements may have to be taken. In addition to the regular co-channel interference present in half duplex systems, namely base station (BS) to UE and UE to BS interferences, there are two unique interferences caused by system operation in full duplex mode: BS-BS interference, and UE-UE interference. Due to STR at BSs, neighboring BSs' downlink (DL) signals interfere with desired uplink (UL) signal at a home BS. This is called BS-BS interference and may be severe. Unlike BS to UE channel interference (downlink or uplink), the BS-to-BS channel interference may be closer to line-of-sight (LoS) with much lower path loss. Further, the transmit power and antenna gain at a BS may generally be much larger than those of UE. Hence, the interferences from neighboring BSs to a home BS easily dominate a desired weak UL signal that is transmitted from a UE. Hence, without cancelling BS-BS interferences, UL communication may be difficult if not impossible, or at least reduce the full UL capacity.

To reduce BS-BS interference and increase uplink capacity in a full duplex wireless communication system, nulls may be formed at an elevation angle at BS antennas. Since tilting may be employed at each BS, and since every BS may have a relatively similar height, by creating nulls at the vicinity of 90° in elevation angle, BS-BS interference may be reduced or avoided.

Detailed discussion will first be made concerning STR by referencing, in particular, FIGS. 1-6. Discussion will then be made concerning BS-BS interference and the reduction thereof by referencing, in particular. FIGS. 7-13. Accordingly, FIG. 1 depicts a temporal relationship diagram for simultaneous transmit and receive (STR) for a portion of an exemplary downlink radio frame and a portion an exemplary uplink radio frame of a channel. STR allows transmit and receive operations to occur simultaneously at the same RF carrier. Accordingly, STR can increase channel capacity to up to twice that of a conventional Time Division Duplexing (TDD) based and/or Frequency Division Duplexing (FDD) based channel because the downlink (DL) and uplink (UL) channels share the same RF carrier both in time and in frequency resources. In one exemplary embodiment, the network infrastructure (i.e., the base station (BS), enhanced NodeB (eNB), femtocell, home eNB, etc.) implements simultaneous transmit and receive according to the subject matter disclosed herein if a user equipment (UE) can simultaneously transmit and receive at the same frequency. More specifically, FIG. 1 depicts the general temporal relationship between an exemplary portion of a downlink (DL) radio frame 100 and an exemplary portion of an uplink (UL) radio frame 150 for simultaneous transmit and receive according to the subject matter disclosed herein. Both DL radio frame 100 and UL radio frame 150 are at the same exemplary RF carrier frequency $f_1$. Exemplary DL radio frame 100 includes a Broadcast & Control Channel portion 101; a second portion 102 in which a DL transmission from the eNB to an exemplary UE 1 is scheduled; a third portion 103 in which a DL transmission from the eNB to an exemplary UE 2 is scheduled; a fourth portion 104 in which a DL transmission from the eNB to an exemplary UE 3 is scheduled; and a fifth portion 105 in which no DL transmission is scheduled. Exemplary UL radio frame 150 includes a first portion 151 in which no UL transmission is scheduled; a second portion 152 in which an UL transmission from UE 2 to the eNB is scheduled; a third portion 153 in which an UL transmission from UE 3 is scheduled, a fourth portion 154 in which an UL transmission from UE 1 is scheduled; and a fifth portion 155 in which an UL transmission from an exemplary UE 4 is scheduled. It should be understood that both DL radio frame 100 and UL radio frame 150 could include additional portions that are not depicted in FIG. 1 or described herein.

As depicted in FIG. 1, during the first portion 101 of DL frame 100 when the eNB transmits broadcast channel and control channel information, no UE UL transmission should be scheduled as the UEs are in a receive mode to receive scheduling and other control channel information. (If however, a UE is STR capable, the UE can be scheduled for UL transmission). At the end of first portion 101, both DL transmissions from the eNB and UL transmissions from UEs are scheduled to occur simultaneously. Because the time for a UE to switch from a transmission mode (Tx) to a receive mode (Rx), and from Rx to TX is generally non-zero, scheduling of DL and UL transmission for a particular UE that does not have STR capability must provide a time delay between DL and UL transmissions so that the UE has sufficient time switch between Tx to Rx modes and Rx to Tx modes. In one exemplary embodiment, a 5 μsec time delay is used for allowing a UE that does not have STR capability to switch between Tx and Rx modes and between Rx and Tx modes. In another exemplary embodiment, a time delay of less than 5 μsec could be used. In still another exemplary embodiment, the respective times to switch between Tx and Rx modes and between Rx and Tx modes are substantially the same. In yet another exemplary embodiment, the respective times to switch between Tx and Rx modes and between Rx and Tx modes differs. Additionally, because a UE may not necessarily have a STR capability, a scheduler device should avoid scheduling DL and UL packets for a particular UE that overlap both in time and carrier frequency. Alternatively, if a UE has STR capability, then a scheduler device can schedule DL and UL packets for the STR-capable UE that overlap both in time and carrier frequency.

If UE is not STR capable, FIG. 1 depicts, for example, that during second portion 102 of DL frame 100, the eNB is transmitting a DL signal to UE 1, while simultaneously UE 2 is transmitting a UL signal to the eNB during the second portion 152 of UL frame 150. If UE 2 is not STR capable, then a time delay t0 is added to the schedule so that UE 2 has enough time to switch from a Rx mode to a Tx mode. Also as depicted in FIG. 1, a DL transmission from the eNB to UE 2 is scheduled during a third portion 103; consequently, the second portion 152 of UL frame 150 is scheduled to end with enough time t1 for UE 2 to switch from a Tx mode to an Rx mode. During the third portion 153 of UL frame 150, UE 3 is scheduled to transmit a UL signal to the eNB. The exemplary third portion 153 is scheduled to end so that UE 3 has sufficient time t3 to switch from the Tx mode to the Rx mode to receive the scheduled DL signal transmitted from the eNB to UE 3 during the forth portion 104 of DL frame 100. Additionally, the DL signal from the eNB to UE 1 during second portion 102 of DL frame 100 is scheduled to end so that there is sufficient time t2 for UE 1 to switch from the Rx mode to the Tx mode and transmit a UL signal to the eNB during the forth portion 154 of the UL frame 150. No DL transmission is scheduled during the fifth portion 105 of DL frame 100, and during the fifth portion 155 of UL frame 150, UE 4 (which for this example is located near an edge of the cell of the eNB, and thereby produces a low received signal power at the eNB) is scheduled to transmit a UL signal when no DL signal is transmitted by the eNB in order to reduce the adverse effects of interference even if UE 4 is STR-capable.

For both STR-capable UE and an STR-incapable UE, during portion 102 of DL signal 100 and portion 152 of UL signal, if the respective UL transmission from UE 2 unacceptably interferes with the UL signal for UE 1, the respective transmission for UE 1 and UE 2 could be scheduled to be at different subbands, thereby reducing the interference. Alternatively and additionally, UE 1 and UE 2 could be selected based on their relative physical positioning in the cell to reduce interference, that is, UE 1 and UE 2 could be selected to be physically far apart in the cell to reduce interference.

For FIG. 1, UE 4 was described as being located near an edge of the cell of the eNB, and thereby producing a low received signal power at the eNB: consequently, simultaneous transmit and receive may not work effectively. For situations in which a UE is physically located near an edge of a cell, and/or a received weak signal from a UE, a scheduler device may determine to not schedule any DL transmission so that UL transmissions from the UE are reliably received at the eNB. In the situation in which both the eNB and the UE are STR capable, and if the simultaneous transmit and receive is not effective because the STR-capable UE is located near an edge of the cell, the eNB and UE could operate in a TDD-based mode. That is, if either device is transmitting a signal, the other device should not transmit any signal.

In an alternative exemplary embodiment, a UE comprises the capability to communicate the time delay required for the UE to switch from a Tx mode to a Rx mode and/or from a Rx mode to a Tx mode. The scheduler device associated with the eNB could use the specific time delays communicated from a UE to optimize scheduling of simultaneous transmit and receive operation during a radio frame.

Figure 2:
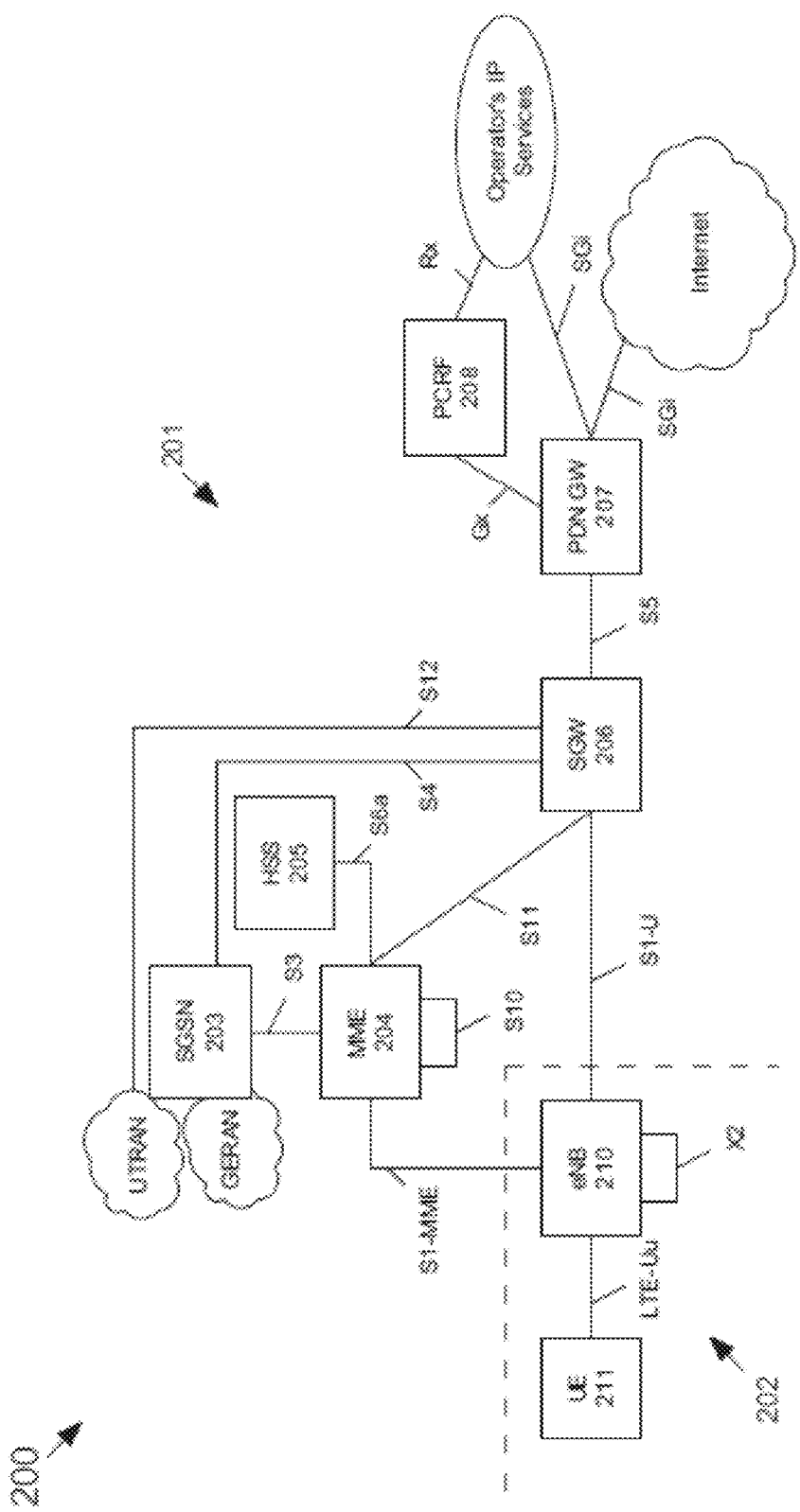
FIG. 2 shows a block diagram of the overall architecture of an exemplary wireless cellular network that uses STR.

FIG. 2 shows a block diagram of the overall architecture of a Third Generation Partnership Project Long Term Evolution (3GPP LTE) network including network elements and standardized interfaces and utilizing a simultaneous transmit and receive according to the subject matter disclosed herein. At a high level, network 200 comprises a core network (CN) 201 (also referred to as the evolved Packet System (EPC)), and an air-interface access network Evolved Universal Mobile Telecommunication Service (UMTS) Terrestrial Radio Access Network (E-UTRAN) 202. CN 201 is responsible for the overall control of the various User Equipment (UE) connected to the network and establishment of the bearers. E-UTRAN 202 is responsible for all radio-related functions.

The main logical nodes of CN 201 include a Serving General Packet Radio Service (GPRS) Support Node 203, the Mobility Management Entity 204, a Home Subscriber Server (HSS) 205, a Serving Gate (SGW) 206, a Packet Data Network (PDN) Gateway 207 and a Policy and Charging Rules Function (PCRF) Manager 208. The functionality of each of the network elements of CN 201 is well known and is not described herein. Each of the network elements of CN 201 are interconnected by well-known standardized interfaces, some of which are indicated in FIG. 2, such as interfaces S3, S4, S5, etc., although not described herein.

While CN 201 includes many logical nodes, the E-UTRAN access network 202 is formed by one node, the evolved NodeB (eNB) 210, which connects to one or more User Equipment (UE) 211, of which only one is depicted in FIG. 2. For normal user traffic (as opposed to broadcast), there is no centralized controller in E-UTRAN; hence the E-UTRAN architecture is said to be flat. The eNBs are normally interconnected with each other by an interface known as "X2" and to the EPC by an S1 interface. More specifically, to Mobility Management Entity (MME) 204 by an S1-MME interface and to the SGW by an S1-U interface. The protocols that nm between the eNBs and the UEs are generally referred to as the "Applicability Statement (AS) protocols." Details of the various interfaces are well known and not described herein.

The eNB 210 hosts the Physical (PHY), Medium Access Control (MAC), Radio Link Control (RLC), and Packet Data Control Protocol (PDCP) layers, which are not shown in FIG. 2, and which include the functionality of user-plane header-compression and encryption. The eNB 210 also provides Radio Resource Control (RRC) functionality corresponding to the control plane, and performs many functions including radio resource management, admission control, scheduling, enforcement of negotiated Up Link (UL) Quality of Service (QoS), cell information broadcast, ciphering/deciphering of user and control plane data, and compression/decompression of DL/UL user plane packet headers.

The RRC layer in eNB 210 covers all functions related to the radio bearers, such as radio bearer control, radio admission control, radio mobility control, scheduling and dynamic allocation of resources to UEs in both uplink and downlink, scheduling of simultaneous transmission and receive, header compression for efficient use of the radio interface, security of all data sent over the radio interface, and connectivity to the EPC. The RRC layer makes handover decisions based on neighbor cell measurements sent by UE 211, generates pages for UEs 211 over the air, broadcasts system information, controls UE measurement reporting, such as the periodicity of Channel Quality Information (CQI) reports, and allocates cell-level temporary identifiers to active UEs 211. The RRC layer also executes transfer of UE context from a source eNB to a target eNB during handover, and provides integrity protection for RRC messages. Additionally, the RRC layer is responsible for the setting up and maintenance of radio bearers.

Figure 3:
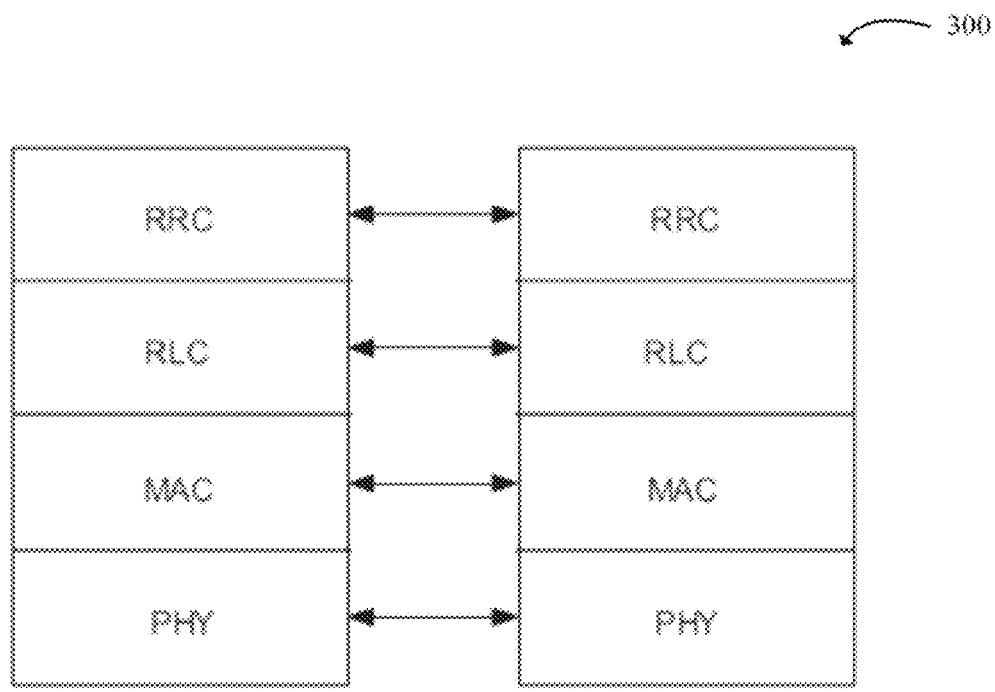
FIGS. 3-4 depict exemplary radio interface protocol structures between a user equipment (UE) and a base station (BS) that use STR.
Figure 4:
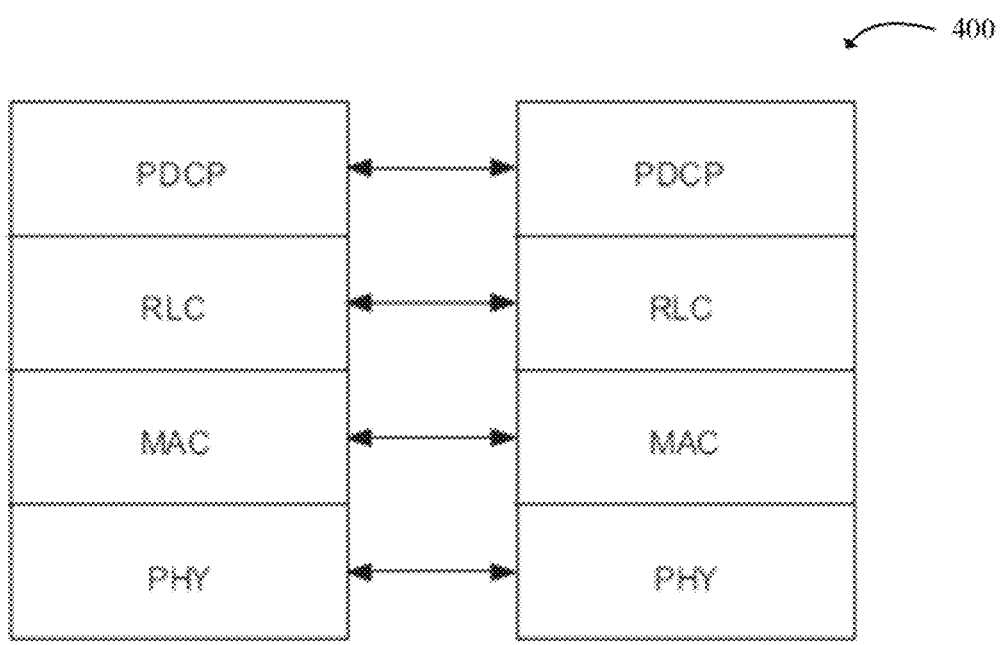

FIGS. 3 and 4 depict radio interface protocol structures between a UE and an eNodeB that are based on a 3GPP-type radio access network standard and that utilize a simultaneous transmit and receive technique in accordance with the subject matter disclosed herein. More specifically, FIG. 3 depicts individual layers of a radio protocol control plane and FIG. 4 depicts individual layers of a radio protocol user plane. The protocol layers of FIGS. 3 and 4 can be classified into an L1 layer (first layer), an L2 layer (second layer) and an L3 layer (third layer) on the basis of the lower three layers of the OSI reference model widely known in communication systems.

The physical (PHY) layer, which is the first layer (L1), provides an information transfer service to an upper layer using a physical channel. The physical layer is connected to a Medium Access Control (MAC) layer, which is located above the physical layer, through a transport channel. Data is transferred between the MAC layer and the PHY layer through the transport channel. A transport channel is classified into a dedicated transport channel and a common transport channel according to whether or not the channel is shared. Data transfer between different physical layers, specifically between the respective physical layers of a transmitter and a receiver, is performed through the physical channel.

A variety of layers exist in the second layer (L2 layer). For example, the MAC layer maps various logical channels to various transport channels, and performs logical-channel multiplexing for mapping various logical channels to one transport channel. The MAC layer is connected to the Radio Link Control (RLC) layer serving as an upper layer through a logical channel. The logical channel can be classified into a control channel for transmitting information of a control plane and a traffic channel for transmitting information of a user plane according to categories of transmission information.

The RLC layer of the second layer (L2) performs segmentation and concatenation on data received from an upper layer, and adjusts the size of data to be suitable for a lower layer transmitting data to a radio interval. In order to guarantee various Qualities of Service (QoSs) requested by respective radio bearers (RBs), three operation modes, i.e. a Transparent Mode (TM), an Unacknowledged Mode (UM), and an Acknowledged Mode (AM), are provided. Specifically, an AM RLC performs a retransmission function using an Automatic Repeat and Request (ARQ) function so as to implement reliable data transmission.

A Packet Data Convergence Protocol (PDCP) layer of the second layer (L2) performs a header compression function to reduce the size of an IP packet header having relatively large and unnecessary control information in order to efficiently transmit IP packets, such as IPv4 or IPv6 packets in a radio interval with a narrow bandwidth. As a result, only information required for a header part of data can be transmitted, so that transmission efficiency of the radio interval can be increased. In addition, in an LTE-based system, the PDCP layer performs a security function that includes a ciphering function for preventing a third party from eavesdropping on data and an integrity protection function for preventing a third party from handling data.

A Radio Resource Control (RRC) layer located at the top of the third layer (L3) is defined only in the control plane and is responsible for control of logical, transport, and physical channels in association with configuration, re-configuration and release of Radio Bearers (RBs). The RB is a logical path that the first and second layers (L1 and L2) provide for data communication between the UE and the UTRAN. Generally, Radio Bearer (RB) configuration means that a radio protocol layer needed for providing a specific service, and channel characteristics are defined and their detailed parameters and operation methods are configured. The Radio Bearer (RB) is classified into a Signaling RB (SRB) and a Data RB (DRB). The SRB is used as a transmission passage of RRC messages in the C-plane, and the DRB is used as a transmission passage of user data in the U-plane.

A downlink transport channel for transmitting data from the network to the UE may be classified into a Broadcast Channel (BCH) for transmitting system information and a downlink Shared Channel (SCH) for transmitting user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Downlink physical channels for transmitting information transferred to a downlink transport channel to a radio interval between the UE and the network are classified into a Physical Broadcast Channel (PBCH) for transmitting BCH information, a Physical Multicast Channel (PMCH) for transmitting MCH information, a Physical Downlink Shared Channel (PDSCH) for transmitting downlink SCH information, and a Physical Downlink Control Channel (PDCCH) (also called a DL L1/L2 control channel) for transmitting control information, such as DL/UL Scheduling Grant information, received from first and second layers (L1 and L2). In the meantime, uplink physical channels for transmitting information transferred to an uplink transport channel to a radio interval between the UE and the network are classified into a Physical Uplink Shared Channel (PUSCH) for transmitting uplink SCH information, a Physical Random Access Channel for transmitting RACH information, and a Physical Uplink Control Channel (PUCCH) for transmitting control information, such as Hybrid Automatic Repeat Request (HARQ) ACK or NACK Scheduling Request (SR) and Channel Quality Indicator (CQI) report information, received from first and second layers (L1 and L2).

Figure 5:
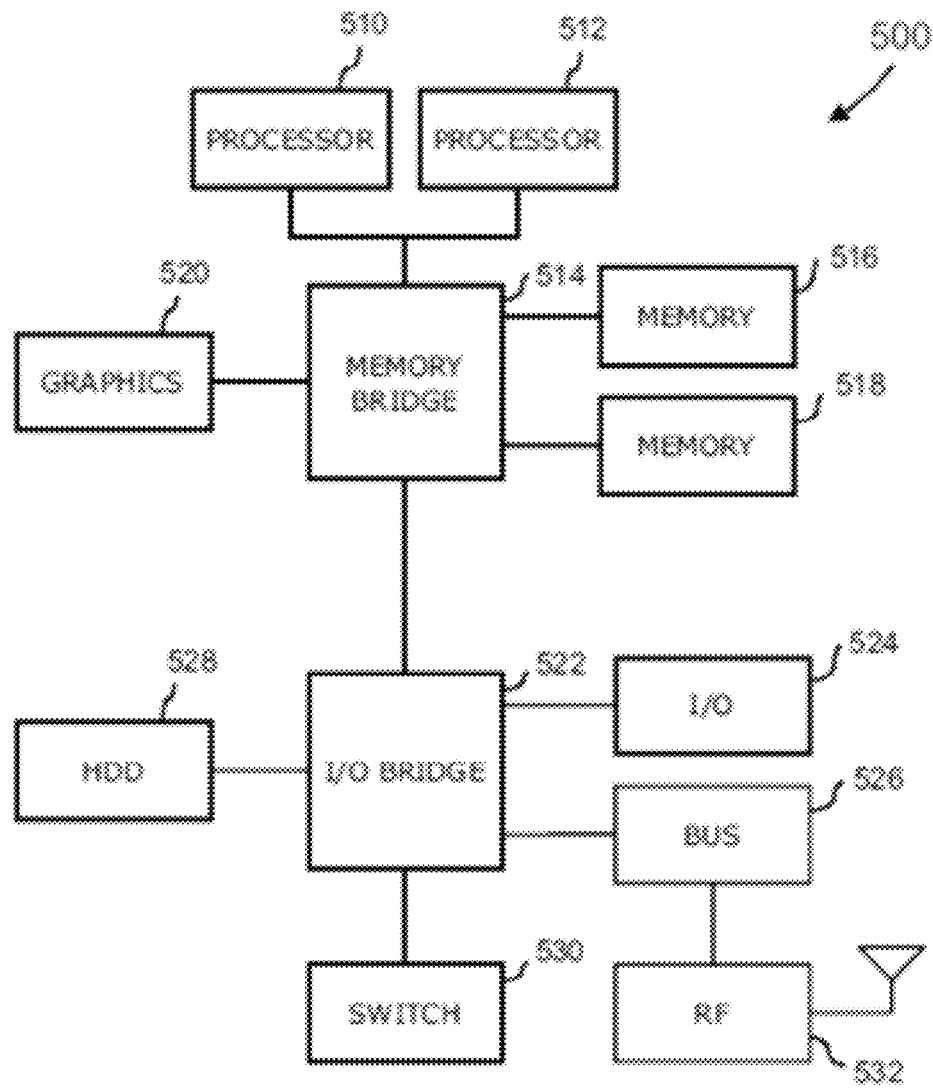
FIG. 5 depicts exemplary functional block diagram of an information-handling system that uses STR.

FIG. 5 depicts functional block diagram of an information-handling system 500 that utilizes a simultaneous transmit and receive technique according to the subject matter disclosed herein. Information-handling system 500 of FIG. 5 may tangibly embody one or more of any of the network elements of core network 200 as shown in and described with respect to FIG. 2. For example, information-handling system 500 may represent the hardware of eNB 210 and/or UE 211, with greater or fewer components depending on the hardware specifications of the particular device or network element. Although information-handling system 500 represents one example of several types of computing platforms, information-handling system 500 may include more or fewer elements and/or different arrangements of elements than shown in FIG. 5, and the scope of the claimed subject matter is not limited in these respects.

Information-handling system 500 may comprise one or more processors, such as processor 510 and/or processor 512, which may comprise one or more processing cores. One or more of processor 510 and/or processor 512 may couple to one or more memories 516 and/or 518 via memory bridge 514, which may be disposed external to processors 510 and/or 512, or alternatively at least partially disposed within one or more of processors 510 and/or 512. Memory 516 and/or memory 518 may comprise various types of semiconductor-based memory, for example, volatile-type memory and/or non-volatile-type memory. Memory bridge 514 may couple to a graphics system 520 (which may include a graphics processor (not shown) to drive a display device, such as a CRT, an LCD display, an LED display, touch-screen display, etc. (all not shown), coupled to information handling system 500.

Information-handling system 500 may further comprise input/output (I/O) bridge 522 to couple to various types of I/O systems, such as a keyboard (not shown), a display (not shown) and/or an audio output device (not shown), such as a speaker. I/O system 524 may comprise, for example, a universal serial bus (USB) type system, an IEEE-1394-type system, or the like, to couple one or more peripheral devices to information-handling system 500. Bus system 526 may comprise one or more bus systems, such as a peripheral component interconnect (PCI) express type bus or the like, to connect one or more peripheral devices to information-handling system 500. A hard disk drive (HDD) controller system 528 may couple one or more hard disk drives or the like to information handling system, for example, Serial ATA type drives or the like, or alternatively a semiconductor based drive comprising flash memory, phase change, and/or chalcogenide type memory or the like. Switch 530 may be utilized to couple one or more switched devices to I/O bridge 522, for example Gigabit Ethernet type devices or the like. Furthermore, as shown in FIG. 5, information-handling system 500 may include a radio-frequency (RF) block 532 comprising RF circuits and devices for wireless communication with other wireless communication devices and/or via wireless networks, such as core network 200 of FIG. 2, for example, in which information-handling system 500 embodies base station 214 and/or wireless device 216, although the scope of the claimed subject matter is not limited in this respect. In one or more embodiments, information-handling system could comprise an eNB and/or a UE that is provides simultaneous transmit and receive capability according to the subject matter disclosed herein.

Figure 6:
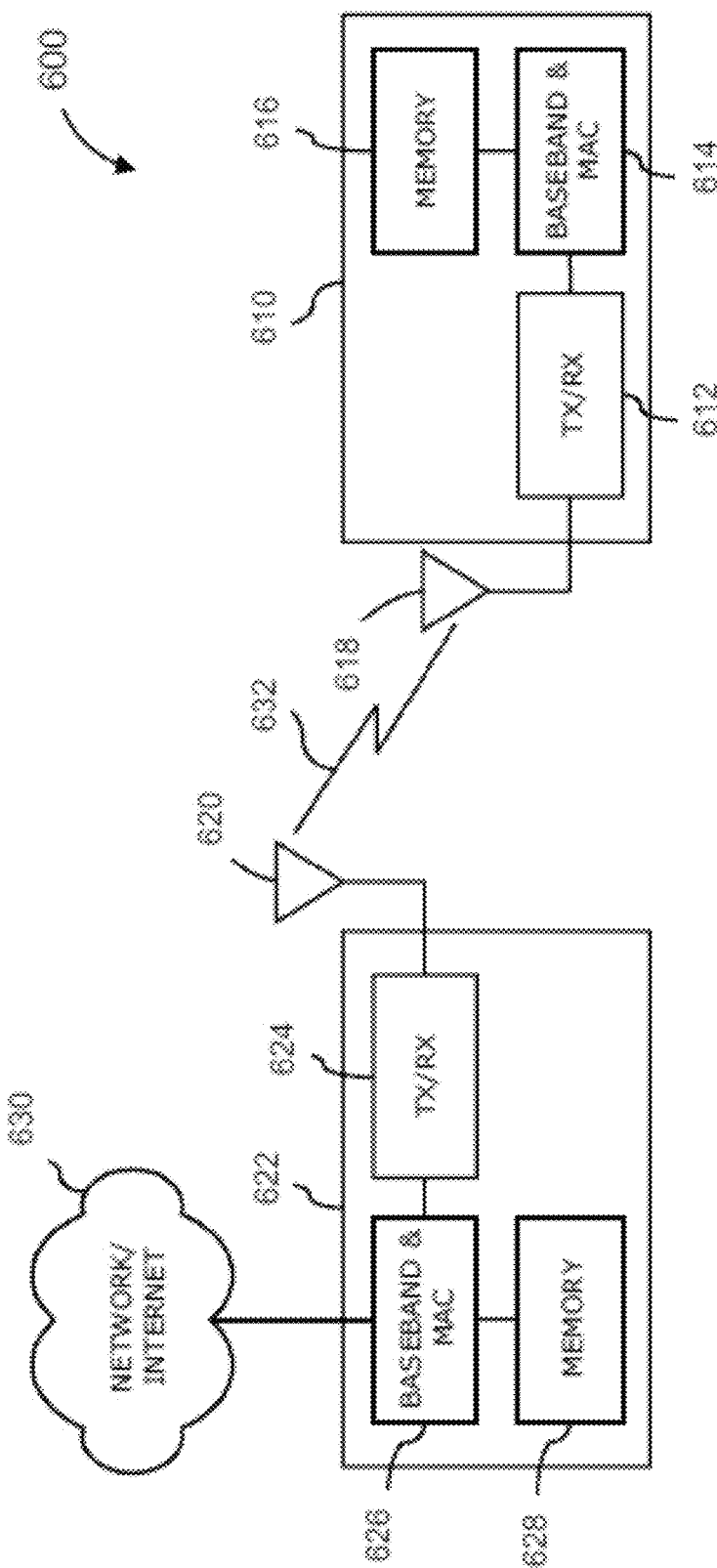
FIG. 6 depicts an exemplary functional block diagram of a wireless cellular network communication system using STR.

FIG. 6 depicts a functional block diagram of a wireless local area or cellular network communication system 600 depicting one or more network devices utilizing a simultaneous transmit and receive technique according to the subject matter disclosed herein. In the communication system 600 shown in FIG. 6, a wireless device 610 may include a wireless transceiver 612 to couple to one or more antennas 618 and to a processor 614 to provide baseband and media access control (MAC) processing functions. In one or more embodiments, wireless device 610 may be a UE that provides simultaneous transmit and receive capability, a cellular telephone, an information-handling system, such as a mobile personal computer or a personal digital assistant or the like, that incorporates a cellular telephone communication module, although the scope of the claimed subject matter is not limited in this respect. Processor 614 in one embodiment may comprise a single processor, or alternatively may comprise a baseband processor and an applications processor, although the scope of the claimed subject matter is not limited in this respect. Processor 614 may couple to a memory 616 that may include volatile memory, such as dynamic random-access memory (DRAM), non-volatile memory, such as flash memory, or alternatively may include other types of storage, such as a hard disk drive, although the scope of the claimed subject matter is not limited in this respect. Some portion or all of memory 616 may be included on the same integrated circuit as processor 614, or alternatively some portion or all of memory 616 may be disposed on an integrated circuit or other medium, for example, a hard disk drive, that is external to the integrated circuit of processor 614, although the scope of the claimed subject matter is not limited in this respect.

Wireless device 610 may communicate with access point 622 via wireless communication link 632, in which access point 622 may include at least one antenna 620, transceiver 624, processor 626, and memory 628. In one embodiment, access point 622 may be an eNB, an eNB having simultaneous transmit and receive scheduling capability, a RRH, a base station of a cellular telephone network, and in an alternative embodiment, access point 622 may be an access point or wireless router of a wireless local or personal area network, although the scope of the claimed subject matter is not limited in this respect. In an alternative embodiment, access point 622 and optionally mobile unit 610 may include two or more antennas, for example, to provide a spatial division multiple access (SDMA) system or a multiple-input-multiple-output (MIMO) system, although the scope of the claimed subject matter is not limited in this respect. Access point 622 may couple with network 630 so that mobile unit 610 may communicate with network 630, including devices coupled to network 630, by communicating with access point 622 via wireless communication link 632. Network 630 may include a public network, such as a telephone network or the Internet, or alternatively network 630 may include a private network, such as an intranet, or a combination of a public and a private network, although the scope of the claimed subject matter is not limited in this respect. Communication between mobile unit 610 and access point 622 may be implemented via a wireless local area network (WLAN), for example, a network compliant with a an Institute of Electrical and Electronics Engineers (IEEE) standard, such as IEEE 802.11a, IEEE 802.11b, HiperLAN-II, and so on, although the scope of the claimed subject matter is not limited in this respect. In another embodiment, communication between mobile unit 610 and access point 622 may be at least partially implemented via a cellular communication network compliant with a 3GPP standard, although the scope of the claimed subject matter is not limited in this respect. In one or more embodiments, antenna(s) 618 may be utilized in a wireless sensor network or a mesh network, although the scope of the claimed subject matter is not limited in this respect.

Figure 7:
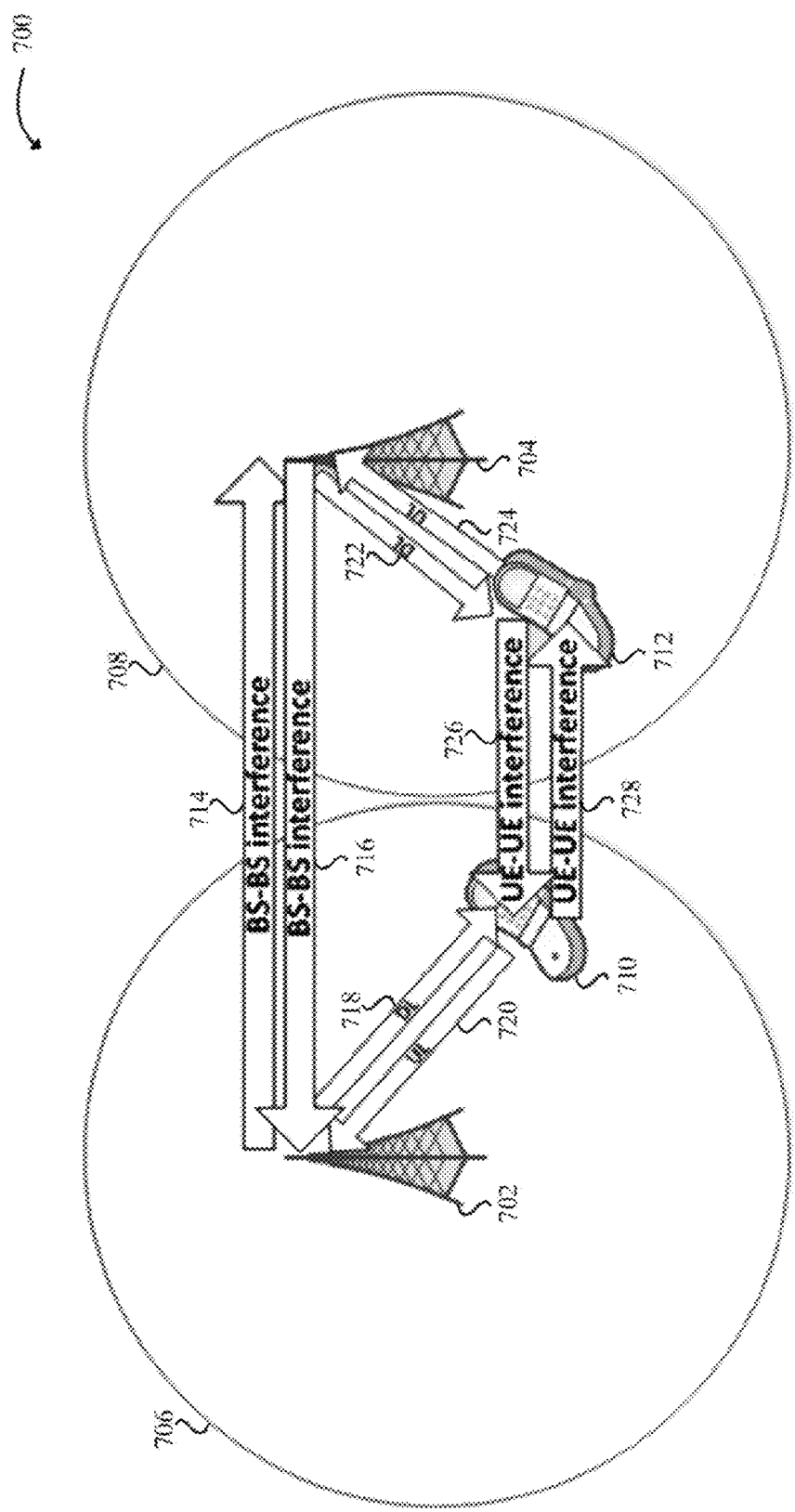
FIG. 7 illustrates types of interference that may be encountered in a wireless cellular network using STR.

Turning now to BS-BS interference in wireless cellular networks using STR, FIG. 7 illustrates types of interference that may be encountered in a wireless cellular network using STR. A simplified depiction of a wireless cellular network 700 is depicted with a BS 702, a BS 704, a UE 710, and a UE 712. The BS 702 covers a cell area 706 while the BS 704 covers a cell area 708. The UE 710 is located in the cell area 706 and is thereby communicatively connected to or associated with the BS 702, while the UE 712 is located in the cell area 708 and is thereby communicatively connected to or associated with the BS 704. That is, the UE 710 has an DL 718 and UL 720 to and from the BS 702, while the UE 712 has a DL 722 and UL 724 to and from the BS 704.

The wireless cellular network 700 illustrated in FIG. 7 is capable of using STR. While STR allows transmission and reception on the same frequency at the same time and can potentially double the physical layer capacity, as depicted, STR may introduce two new unique interferences into a wireless cellular network. There may be a BS-BS interference due to transmissions by the BS 702 that interfere with reception at the BS 704. Conversely, there may be a BS-BS interference due to transmissions by the BS 704 that interfere with reception at the BS 702. There may also be UE-UE interferences 726 and 728. These two new interferences may degrade system performance if not handled appropriately.

In order to reduce BS-BS interference, a transmission and a reception beam having a beam pattern is formed with predetermined nulls formed over selected elevation angles to reduce interference caused by signals sent to and from proximate BSs. Since tilting may be employed, and since each BS may generally have a relatively similar height, by creating nulls around 90 degrees in elevation angle, BS-BS interference may be reduced or effectively eliminated. Predetermined nulls, for example, may be formed between about 89 and 91 degrees.

An example of an antenna configured to provide the predetermined nulls for transmission and reception is provided. It can be assumed, for illustrative purposes, that the antenna has a half wavelength width by b lambda height. For multiple-input and multiple-output (MIMO), generally, multiple antenna elements may be placed horizontally. It can be further assumed that the antenna includes N antenna elements. The b lambda height antenna can be split to ½ lambda height M=b/0.5 antenna elements. In this way, the antenna gain may remain unchanged. M antenna elements may be vertically stacked. Since N antenna elements are horizontally, there is a two dimensional N×M planar array of antenna elements.

Assuming the planar array of antenna elements is located in a x-z plane facing towards a positive y-axis with half lambda spacing of all of the antenna elements, a beam pattern may be formed with the following weight $w_{m,n}$ $$A(\theta, \phi) = \left| \sum_{m=0}^{M-1} \sum_{n=0}^{N-1} w_{m,n} e^{jm\pi \cos(\theta)} e^{jn\pi \sin(\theta)\cos(\phi)} \right|^2 A_{0.5,0.5}(\theta, \phi)$$

where θ is elevation angle measured from z-axis, φ is azimuth angle measured from positive x-axis toward positive y-axis in x-y plane, and $A_{0.5,0.5}(\theta,\phi)$ is a beam pattern due to half lambda height and half lambda width rectangular antenna element. For the backlobe (φ>π), the beam pattern described above may be scaled down by 25 dB. Using the above description, predetermined nulls may be formed at arbitrary azimuth and elevation angles. Predetermined nulls, however, may be particularly useful when formed at selected elevation angles over the entire azimuth angle. In this way, the weight $w_{m,n}$ may be separated by horizontal and vertical weights $w_{m,n} = w_m^v w_n^h$ where superscript v and h respectively represent vertical weight and horizontal weight. The horizontal weights $\{w_n^h\}$ may come from a closed loop or an open loop MIMO technique. Assuming further, and without losing generality, $w_n^h=1$. With 15 degree electrical down tilting, the vertical weight of m-th element becomes $w_m^v = e^{-jm\pi \cos(105\pi/180)}$.

In order to create nulls, minimum mean square error (MMSE) beam forming may be used for both transmit and receive antennas. The following row vector creates nulls toward $\{\phi_m, m \neq 0\}$ while maintaining main beam direction $\phi_0$:

$$w^v = a^H(\phi_0) \left[ a(\phi_0) a^H(\phi_0) + \sum_{m \neq 0} a(\phi_m) a^H(\phi_m) + \varepsilon I \right]^{-1},$$

where $a(\phi_0) = [1 \; e^{j\pi \cos(\phi_0)} \; \ldots \; e^{j(M-1)\pi \cos(\phi_0)}]^T$ is an array vector toward main beam direction $\phi_0$, ε controls the depth of the nulls, and superscript $(\cdot)^H$ represents a complex conjugate transpose. Normalizing the weight vector by the maximum magnitude of the elements so that the magnitude of any element will not exceed 1 can be accomplished with $$w^v = \frac{w^v}{\max_m |w_m^v|}.$$

The above normalization may be more practical than finite normalization of the weight vector, although some loss of power may be expected in transmission mode in simulations. The weight vector for null forming may be used for both transmission and reception, which will relax the requirement on the depth of nulls. Wide nulls may be created from 89 degrees to 91 degrees at 25 meters high BS antennas which allows the variation of BS antenna height from about 16.3 meters to 33.7 meters at neighboring BSs located at 500 meters. Depending on the distribution of antenna heights of neighboring BSs, the range of the nulls may be selected accordingly.

In this way a wireless node may be made operable to perform full duplex communication. In particular, a BS or other wireless node may avoid BS-BS type interference while operating in STR mode by using, for example, computer circuitry, to implement the above described technology. The computer circuitry may be implemented to form a downlink transmission beam and an uplink reception beam having a beam pattern with predetermined nulls. The predetermined nulls may be formed over selected elevation angles to reduce interference to and from proximate wireless nodes. The computer circuitry may further be implemented to transmit using the beam pattern with a transceiver of the wireless node, and receive an uplink transmission at the wireless node while simultaneously transmitting. The computer circuitry may also be implemented to weight antenna elements in a planar array antenna of the to form the predetermined nulls over the selected elevation angles using, M vertically stacked antenna elements that are vertically weighted using the above described equation $$w^v = a^H(\phi_0) \left[ a(\phi_0) a^H(\phi_0) + \sum_{m \neq 0} a(\phi_m) a^H(\phi_m) + \varepsilon I \right]^{-1}$$

where m is an index of nulls into M vertically stacked antenna elements. T is a transpose, and I represents an identity matrix.

The transmission and reception beams may be formed using a planar array of antenna elements. The planar array of antenna elements may be spaced apart approximately half of a width of a wave length of the transmission beam. A backlobe of the transmission beam and the receive beam may be scaled down by at least 25 dB. A predetermined main beam may be formed with 15 degrees electrical down tilting relative to a horizon. The wireless node may be selected from the group consisting of a base station (BS), a Node B (NB), an evolved Node B (eNB), a baseband unit (BBU), a remote radio head (RRH), a remote radio equipment (RRE), a remote radio unit (RRU), or a central processing module (CPM).

Figure 8:
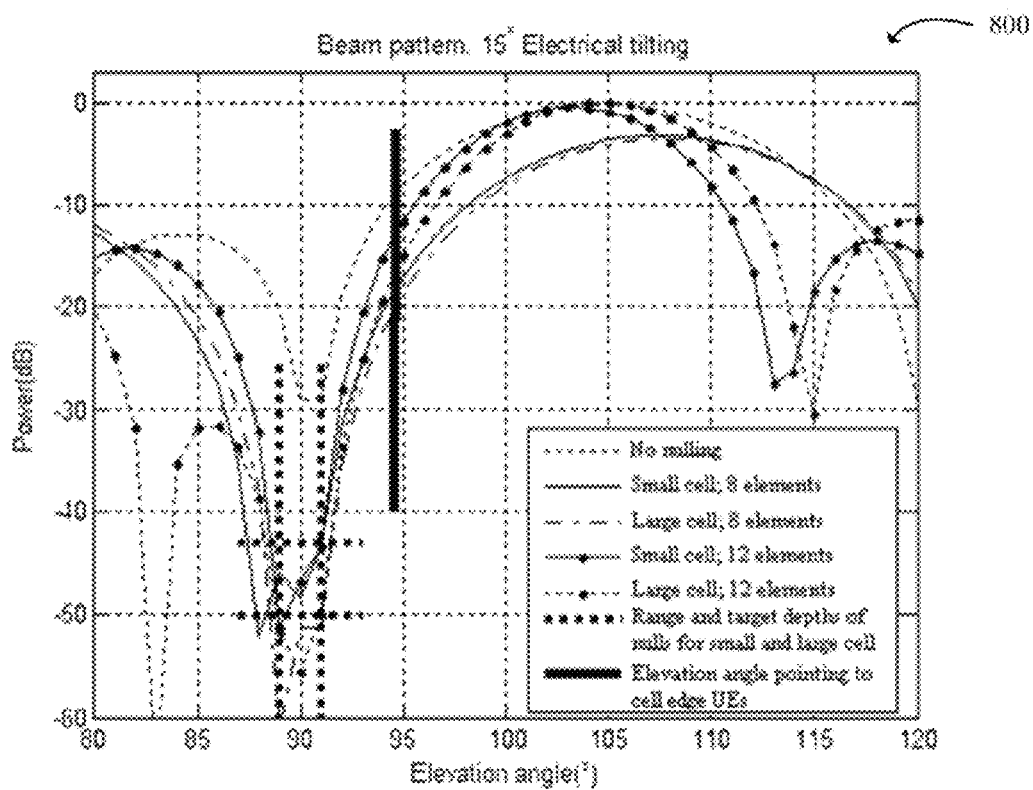
FIG. 8 shows exemplary beam patterns for reducing interference from a BS in a wireless cellular network using STR.

FIG. 8 shows exemplary beam patterns 800 for reducing interference from a BS in a wireless cellular network using STR. Assuming a 4 lambda antenna height with half lambda width, with 15 degree electrical tilting the dotted black line labeled "no nulling" shows the beam pattern. Even if the beam pattern has nulls around 90 degree, the null depths may not be deep enough.

For deeper nulls, the following technique is applied. The 4 lambda may be split to 8 elements of half lambda height. The equation described above, $$w^v = a^H(\phi_0) \left[ a(\phi_0) a^H(\phi_0) + \sum_{m \neq 0} a(\phi_m) a^H(\phi_m) + \varepsilon I \right]^{-1},$$

may then be applied. The two thick dotted vertical and horizontal lines in the FIG. 8 labeled "range and target depths of nulls for a small and large cell" respectively show the range of nulls and represent a target on the depth nulls for small cell and larger cell. In a small cell, since the transmit power is relatively low, the target on the depth of nulls may be relatively loose. The thick black line labeled "elevation angle pointing to cell edge" represents the angle to the cell edge UEs. Due to the predetermined nulls, FIG. 8 shows some loss in signal power especially towards the cell edge. To reduce this, one option may be to reduce the cell size, or the number of antenna elements may be increased to help overcome the loss towards the cell edge.

Figure 9:
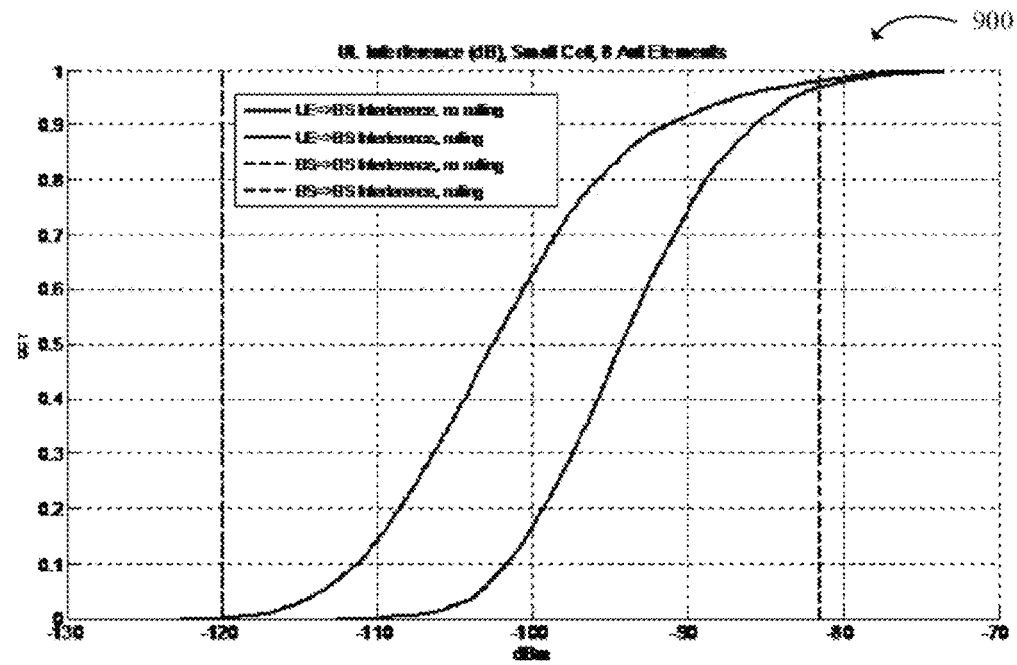
FIG. 9 shows a graph comparing uplink co-channel interference in an exemplary wireless cellular network using STR.

FIG. 9 shows a graph 900 comparing uplink co-channel interference in an exemplary wireless cellular network using STR. In particular, the graph 900 compares the interference power of regular UL co-channel interference with BS-BS interference with and without nulling. It is noticeable that the BS-BS interference power is quite high compared to regular co-channel interference in non-nulling cases. However, with nulling cases, the BS-BS interference resides at a lower edge of UL co-channel interference cumulative distribution function (cdf). The wireless cellular network that employs the heretofore described nulling technique has lower UL interference power because the gain from the beam pattern from 90 degree to 95 degree is smaller than no nulling as is shown in FIG. 9.

Figure 10:
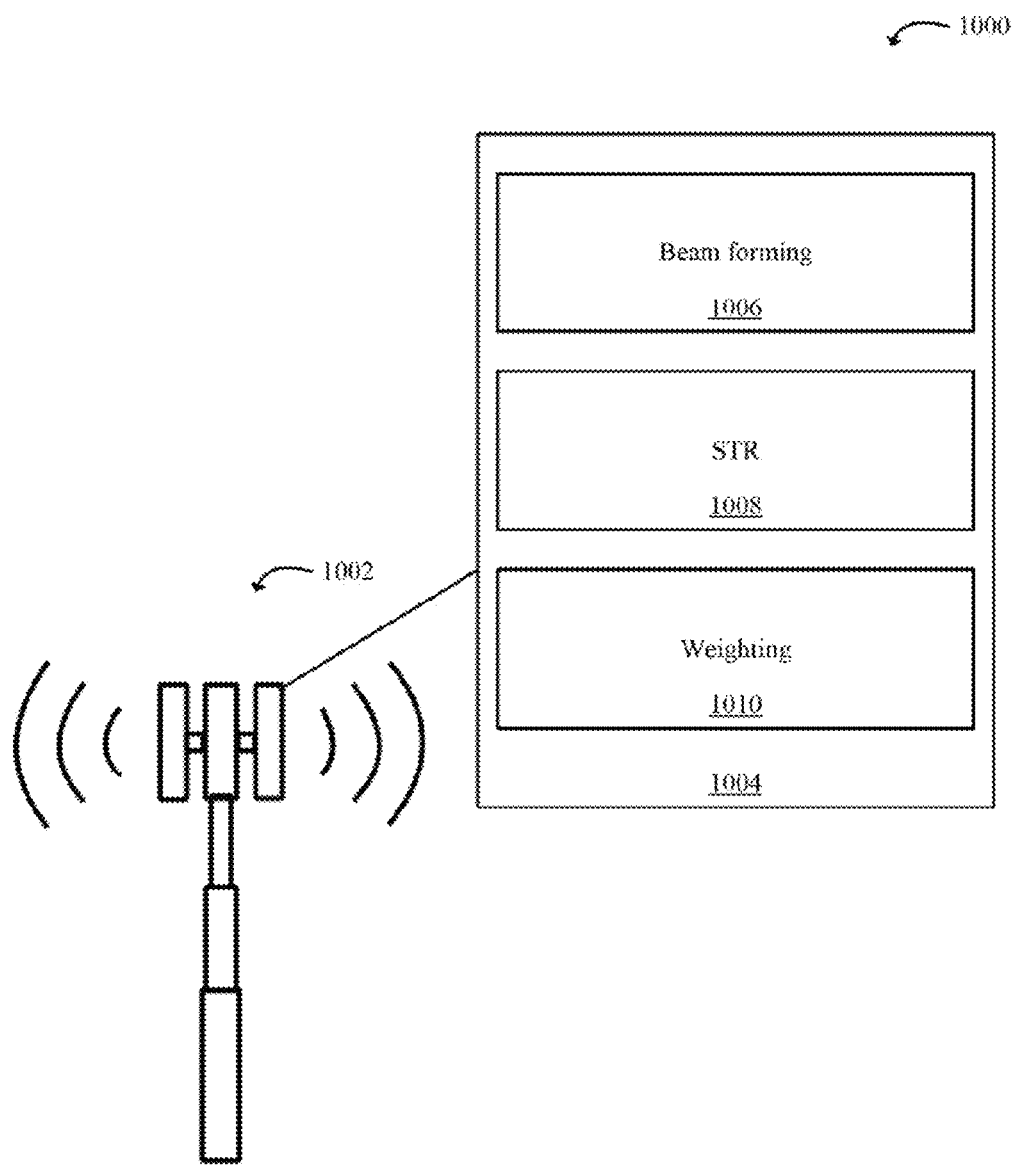
FIG. 10 illustrates exemplary modules in a BS in a wireless cellular network using STR.

FIG. 10 illustrates exemplary modules in a BS in a wireless cellular network 1000 using STR. In particular, a BS 1002 is shown in the wireless cellular network 1000 that has a set of various modules 1004 therein. For example, a beam forming module 1006 is provided in the BS 1002 that is configured to form a transmission and a reception beam having a beam pattern with predetermined nulls. The predetermined nulls may be formed over selected elevation angles to reduce interference to and from proximate BSs. A STR module 1008 is also provided in the BS 1002 that is configured to communicate with a transceiver of the base station that is configured to communicate with a user equipment (UE) in a full-duplex mode, enabling the transceiver to simultaneously transmit and receive. A weighting module 1010 is also depicted in the BS 1002 that is configured to form the predetermined nulls over the selected elevation angles. In this way, the BS 1002 uses the heretofore described technology to reduce BS-to-BS interference in a wireless cellular network that uses STR.

Additionally, one or more of the following features may be included in the BS 1002. The beam forming module 1006 may include a planar array of antenna elements. The antenna elements in the planar array may be spaced approximately half a width of a wave length of the transmission beam apart. A predetermined main beam may be formed with a 15 degree electrical down tilting relative to a horizon. The predetermined nulls may be formed between about 89 and 91 degrees.

Figure 11:
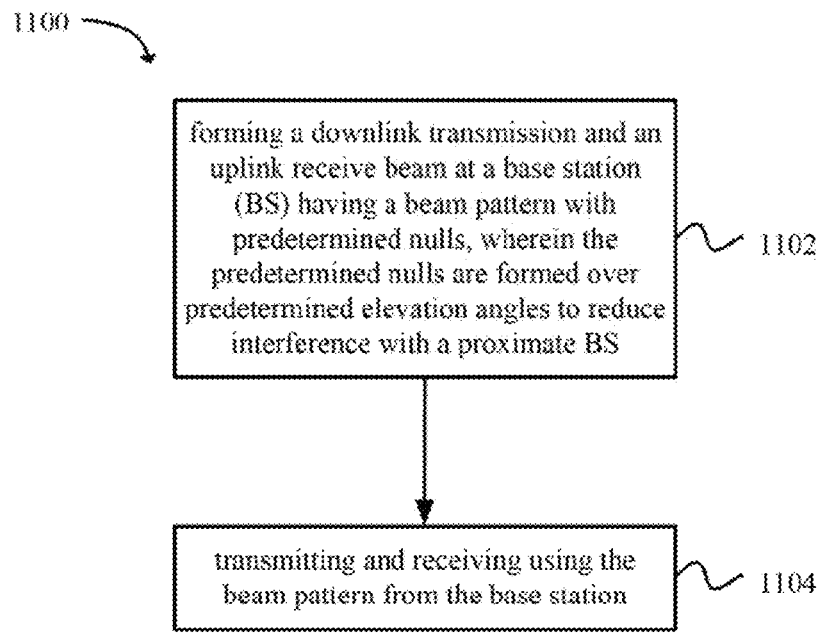
FIG. 11 a flowchart of an exemplary method for reducing interference between BSs in a wireless cellular network operating with STR.

Another example provides a method 1100 for reducing interference between BSs in a wireless cellular network operating with STR, as shown in the flow chart in FIG. 11. The method may be executed as instructions on a machine, where the instructions are included on at least one computer readable medium or one non-transitory machine readable storage medium. The method may include the operation of forming a downlink transmission and an uplink receive beam at a base station (BS) having a beam pattern with predetermined nulls, wherein the predetermined nulls are formed over predetermined elevation angles to reduce interference with a proximate BS, as in block 1102. The method may include transmitting and receiving using the beam pattern from the base station, as in block 1104. The transmitting and receiving may occur simultaneously.

The method may include one or more of the following features. The downlink transmission and uplink reception beam is formed using a planar array of antenna elements. The antenna elements in the planar array of antenna elements may be spaced apart approximately half a width of a wave length of the downlink transmission beam. The method may include forming the downlink transmission and uplink reception beam having the predetermined nulls further comprises vertically weighting m vertically stacked antenna elements using $$w^v = a^H(\phi_0)\left(a(\phi_0)a^H(\phi_0) + \sum_{m \neq 0} a(\phi_m)a^H(\phi_m) + \varepsilon I\right)^{-1},$$

here $a(\phi_0) = [1 \; e^{j\pi \cos(\phi_0)} \; \ldots \; e^{j(M-1)\pi \cos(\phi_0)}]^T$ is an array vector toward a main beam direction $\phi_0$ in elevation angle, m is an index of nulls into M vertically stacked antenna elements, T is a transpose, $\varepsilon$ controls a depth of the predetermined nulls, $(\cdot)^H$ represents a complex conjugate transpose, and I represents an identity matrix. A backlobe of the downlink transmission beam and the uplink receive beam may be scaled down by at least 25 dB. The predetermined nulls may be formed over substantially an entire azimuth angle at the predetermined elevation angles $\phi_m, m \neq 0$. The transmission and the reception at the base station may be performed using a multiple-in-multiple-out (MIMO) technique. A predetermined main beam $\phi_0$ may be formed with 15 degrees electrical down tilting relative to a horizon. The predetermined nulls may be formed between elevation angles of about 89 and 91 degrees. The method may embodied on at least one non-transitory machine readable storage medium comprising a plurality of instructions adapted to be executed to implement the method.

Figure 12:
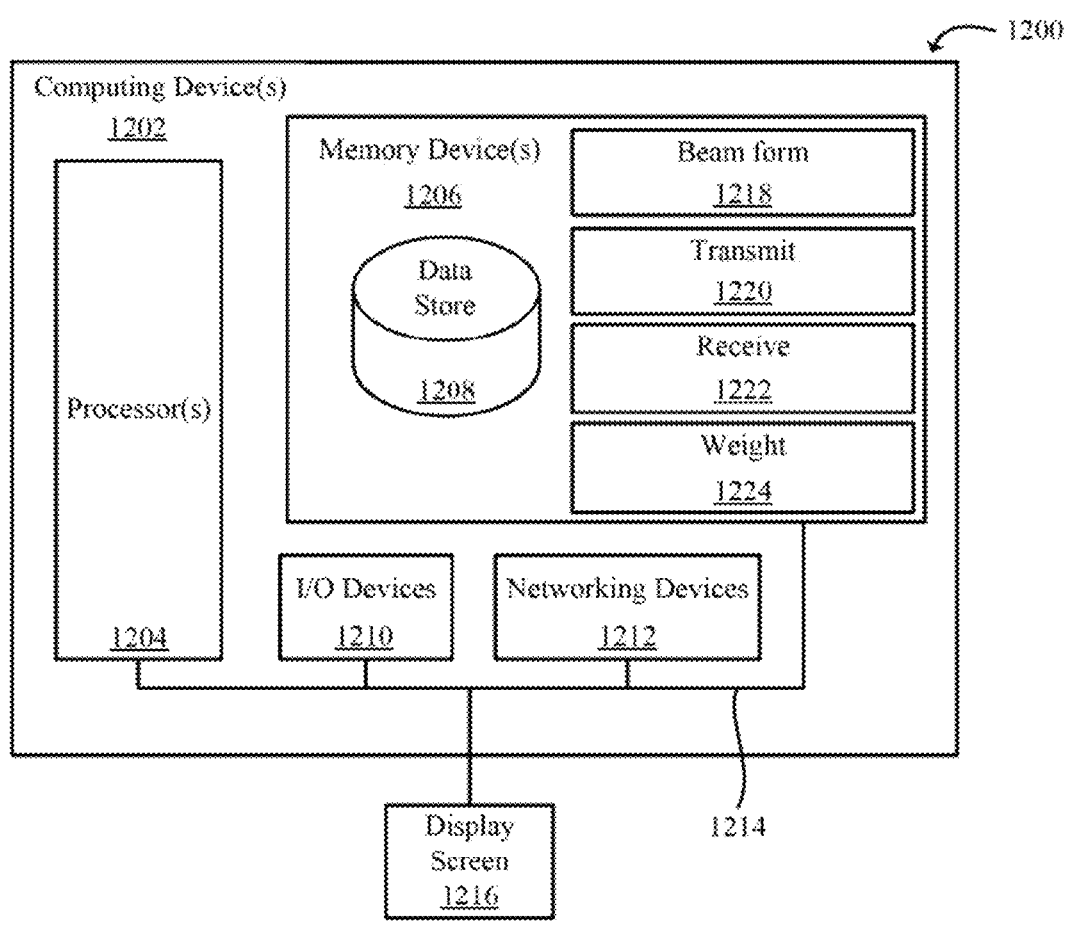
FIG. 12 is block diagram illustrating an example of a computing device that may be used for reducing BS-BS interference in a wireless cellular network operating with STR.

FIG. 12 is a block diagram 1200 illustrating an example of a computing device that may be used for reducing BS-BS interference in a wireless cellular network operating with STR. In particular, the computing device 1202 illustrates a high level example of a device on which modules of the disclosed technology may be executed. The computing device 1202 may include one or more processors 1204 that are in communication with memory devices 1206. The computing device 1202 may include a local communication interface 1214 for the components in the computing device. For example, the local communication interface may be a local data bus and/or any related address or control busses as may be desired.

The computing device 1202, for instance, may be used to reduce interference between BSs in a wireless cellular network operating with STR. For example, the computing device 1202 may be used to form a downlink transmission and an uplink receive beam at a BS. The beam pattern may have predetermined nulls that are formed over predetermined elevation angles to reduce interference with a proximate BS. The computing device 1202 may then be used to transmit and receive using the beam pattern from the BS. In this way transmission and reception may occur simultaneously using STR.

In particular, the memory device 1206 may contain modules that are executable by the processor(s) 1204 and data for the modules. Located in the memory device 1206 are modules executable by the processor. For example, a beam form module 1218, a transmit module 1220, a receive module 1222, a weight module 1224 and other modules may be located in the memory device 1206. The modules may execute the functions described earlier. A data store 1208 may also be located in the memory device 1206 for storing data related to the modules and other applications along with an operating system that is executable by the processor(s) 1204.

Other applications may also be stored in the memory device 1206 and may be executable by the processor(s) 1204. Components or modules discussed in this description that may be implemented in the form of software using high programming level languages that are compiled, interpreted or executed using a hybrid of the methods.

The computing device may also have access to I/O (input/output) devices 1210 that are usable by the computing devices. An example of an I/O device is a display screen 1216 that is available to display output from the computing devices. Other known I/O devices may be used with the computing device as desired. Networking devices 1212 and similar communication devices may be included in the computing device. The networking devices 1212 may be wired or wireless networking devices that connect to the internet, a LAN, WAN, or other computing network.

The components or modules that are shown as being stored in the memory device 1206 may be executed by the processor(s) 1204. The term "executable" may mean a program file that is in a form that may be executed by a processor 1204. For example, a program in a higher level language may be compiled into machine code in a format that may be loaded into a random access portion of the memory device 1206 and executed by the processor 1204, or source code may be loaded by another executable program and interpreted to generate instructions in a random access portion of the memory to be executed by a processor. The executable program may be stored in any portion or component of the memory device 1206. For example, the memory device 1206 may be random access memory (RAM), read only memory (ROM), flash memory, a solid state drive, memory card, a hard drive, optical disk, floppy disk, magnetic tape, or any other memory components.

The processor 1204 may represent multiple processors and the memory device 1206 may represent multiple memory units that operate in parallel to the processing circuits. This may provide parallel processing channels for the processes and data in the system. The local interface 1214 may be used as a network to facilitate communication between any of the multiple processors and multiple memories. The local interface 1214 may use additional systems designed for coordinating communication such as load balancing, bulk data transfer and similar systems.

Figure 13:
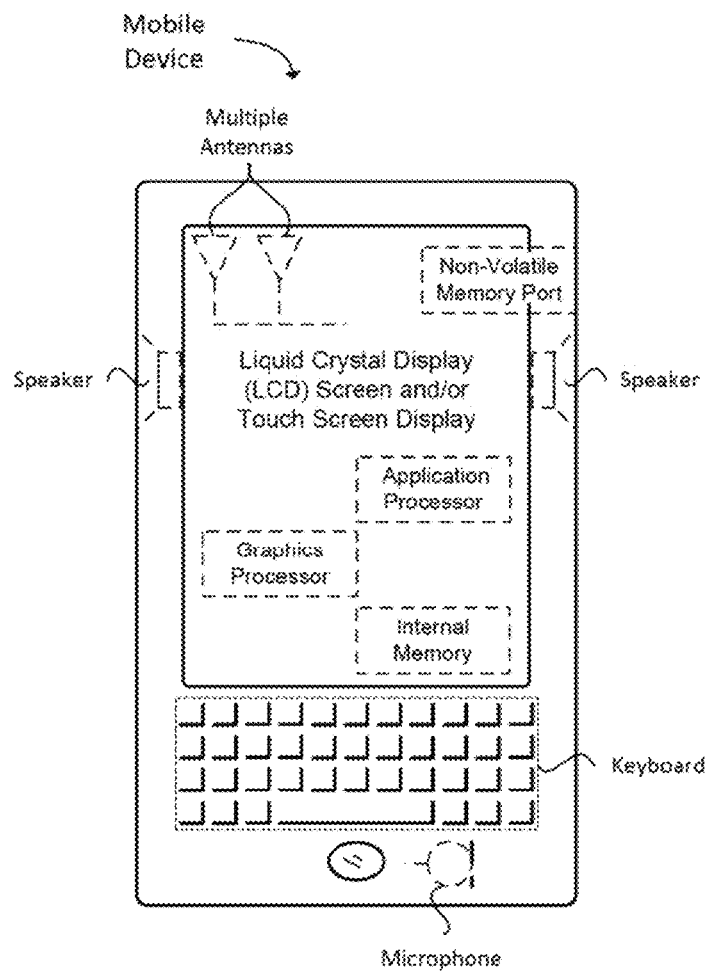
FIG. 13 is illustrates a diagram of a wireless device (e.g., UE) in accordance with an example.

FIG. 13 provides an example illustration of the wireless device, such as an user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 13 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e. instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid state drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A base station (BS) in a wireless cellular network, comprising:
   a beam forming device that is configured to form a transmission and a reception beam having a beam pattern with predetermined nulls, wherein the predetermined nulls are formed over selected elevation angles to reduce interference to and from proximate base stations (BSs);
   a simultaneous transmit and receive (STR) device that is configured to communicate with a transceiver of the base station that is configured to communicate with a user equipment (UE) in a full-duplex mode enabling the transceiver to simultaneously transmit and receive; and
   a weighting device that is configured to weight antenna elements in a planar array antenna of the base station to form the predetermined nulls over the selected elevation angles using, M vertically stacked antenna elements that are vertically weighted using:

$$w^v = a^H(\phi_0)\left(a(\phi_0)a^H(\phi_0) + \sum_{m \neq 0} a(\phi_m)a^H(\phi_m) + \varepsilon I\right)^{-1},$$

wherein $a(\phi_0) = [1 \ e^{j\pi \cos(\phi_0)} \ldots e^{j(M-1)\pi \cos(\phi_0)}]^T$ is an array vector toward main beam direction $\phi_0$ in elevation angle,
wherein m is an index of nulls into M vertically stacked antenna elements,
wherein T is a transpose,
wherein $\varepsilon$ controls a depth of the predetermined nulls,
wherein $(\cdot)^H$ represents a complex conjugate transpose, and
wherein I represents an identity matrix.

2. The BS of claim 1, wherein the beam forming device includes a planar array of antenna elements.

3. The BS of claim 2, wherein the antenna elements in the planar array are spaced half a width of a wave length of the transmission beam apart.

4. The BS of claim 1, wherein a predetermined main beam is formed with a 15 degree electrical down tilting relative to a horizon.

5. The BS of claim 1, wherein the predetermined nulls are formed between 89 and 91 degrees.

6. A wireless node operable to perform full duplex communication, having computer circuitry comprising:
   a beam forming device that is configured to form a downlink transmission beam and an uplink reception beam having a beam pattern with predetermined nulls, wherein the predetermined nulls are formed over selected elevation angles to reduce interference to and from proximate wireless nodes;
   a transmit device that is configured to transmit using the beam pattern with a transceiver of the wireless node;
   a receive device that is configured to receive an uplink transmission at the wireless node while simultaneously transmitting; and
   a weight device that is configured to weight antenna elements in a planar array antenna of the wireless node to form the predetermined nulls over the selected elevation angles using, M vertically stacked antenna elements that are vertically weighted using:

$$w^v = a^H(\phi_0)\left(a(\phi_0)a^H(\phi_0) + \sum_{m \neq 0} a(\phi_m)a^H(\phi_m) + \varepsilon I\right)^{-1},$$

wherein $a(\phi_0) = [1 \ e^{j\pi \cos(\phi_0)} \ldots e^{j(M-1)\pi \cos(\phi_0)}]^T$ is an array vector toward main beam direction $\phi_0$ in elevation angle,
wherein m is an index of nulls into M vertically stacked antenna elements,
wherein T is a transpose,
wherein $\varepsilon$ controls a depth of the predetermined nulls,
wherein $(\cdot)^H$ represents a complex conjugate transpose, and
wherein I represents an identity matrix.

7. The wireless node of claim 6, wherein the transmission and reception beams are formed using a planar array of antenna elements.

8. The wireless node of claim 7, wherein the planar array of antenna elements are spaced apart approximately half of a width of a wave length of the transmission beam.

9. The wireless node of claim 6, wherein a backlobe of the transmission beam and the receive beam are scaled down by at least 25 dB.

10. The wireless node of claim 6, wherein a predetermined main beam is formed with 15 degrees electrical down tilting relative to a horizon.

11. The wireless node of claim 6, wherein the wireless node is selected from the group consisting of a base station (BS), a Node B (NB), an evolved Node B (eNB), a baseband unit (BBU), a remote radio head (RRH), a remote radio equipment (RRE), a remote radio unit (RRU), or a central processing module (CPM).

12. A method for reducing interference between base stations (BSs) in a wireless cellular network operating with simultaneous transmission and reception, comprising:
   forming a downlink transmission and an uplink receive beam at a base station (BS) having a beam pattern with predetermined nulls, wherein the predetermined nulls are formed over predetermined elevation angles to reduce interference with a proximate BS; and
   transmitting and receiving using the beam pattern from the base station,
   wherein transmitting and receiving occur simultaneously, and forming the downlink transmission and uplink reception beam having the predetermined nulls further comprises vertically weighting m vertically stacked antenna elements using:

$$w^v = a^H(\phi_0)\left(a(\phi_0)a^H(\phi_0) + \sum_{m \neq 0} a(\phi_m)a^H(\phi_m) + \varepsilon I\right)^{-1},$$

wherein $a(\phi_0) = [1 \ e^{j\pi \cos(\phi_0)} \ldots e^{j(M-1)\pi \cos(\phi_0)}]^T$ is an array vector toward a main beam direction $\phi_0$ in elevation angle,
wherein m is an index of nulls into M vertically stacked antenna elements,
wherein T is a transpose,
wherein $\varepsilon$ controls a depth of the predetermined nulls,
wherein $(\cdot)^H$ represents a complex conjugate transpose, and
wherein I represents an identity matrix.

13. The method of claim 12, wherein the downlink transmission and uplink reception beam is formed using a planar array of antenna elements.

14. The method of claim 13, wherein antenna elements in the planar array of antenna elements are spaced apart half a width of a wave length of the downlink transmission beam.

15. The method of claim 12, wherein a backlobe of the downlink transmission beam and the uplink receive beam is scaled down by at least 25 dB.

16. The method of claim 12, wherein the predetermined nulls are formed over an entire azimuth angle at the predetermined elevation angles $\phi_m, m \neq 0$, wherein m is an index of nulls into M vertically stacked antenna elements and $\phi_m$ are predetermined elevation angles.

17. The method of claim 12, wherein the transmission and the reception at the base station is performed using a multiple-in-multiple-out (MIMO) technique.

18. The method of claim 12, wherein a predetermined main beam $\phi_0$ is formed with 15 degrees electrical down tilting relative to a horizon.

19. The method of claim 12, wherein the predetermined nulls are formed between elevation angles of about 89 and 91 degrees.

20. At least one non-transitory machine readable storage medium comprising a plurality of instructions adapted to be executed to implement the method of claim 12.

* * * * *